United States Patent [19]

Martin

[11] 4,011,969

[45] Mar. 15, 1977

[54] MATERIAL DISPENSER

[76] Inventor: Ernest Newell Martin, 1027 E. 5th St., Escondido, Calif. 92025

[22] Filed: May 19, 1976

[21] Appl. No.: 688,007

[52] U.S. Cl. .............................. 222/196; 222/231; 222/246; 222/504; 318/114
[51] Int. Cl.² ..................... B65G 3/12; B65G 27/24
[58] Field of Search .......... 222/196, 230, 231, 246, 222/504; 318/114; 251/77, 141

[56] References Cited
UNITED STATES PATENTS

| 2,310,185 | 2/1943 | Wyandant | 318/114 |
| 2,526,735 | 10/1950 | Duce | 222/196 |
| 3,200,997 | 8/1965 | Creswick | 222/196 X |

Primary Examiner—Stanley H. Tollberg
Assistant Examiner—Hadd Lane
Attorney, Agent, or Firm—Georges A. Maxwell

[57] ABSTRACT

A material dispenser comprising a material receiver, an elongate vertical material conducting duct communicating with and depending from the receiver and having a lower open discharge end, a vertically opening metering orifice in the duct, a valving member normally engaged in the orifice in a closed position and shiftable vertically to an open position, an armature freely engaged in the duct and shiftable upwardly therein from a lower normal position, means drivingly connecting the armature and the valve member, an annular coil about the duct and positioned so its field normally intersects the armature whereby the armature is drivingly elevated and the valve member is moved to its open position when the coil is energized, a power supply connected with and operable to cyclically energize the coil and including a half-wave rectifier in series with the coil and a resistor in parallel with the rectifier, whereby the coil is energized by pulsating direct current and supplemental alternating current.

16 Claims, 6 Drawing Figures

U.S. Patent
Mar. 15, 1977
4,011,969
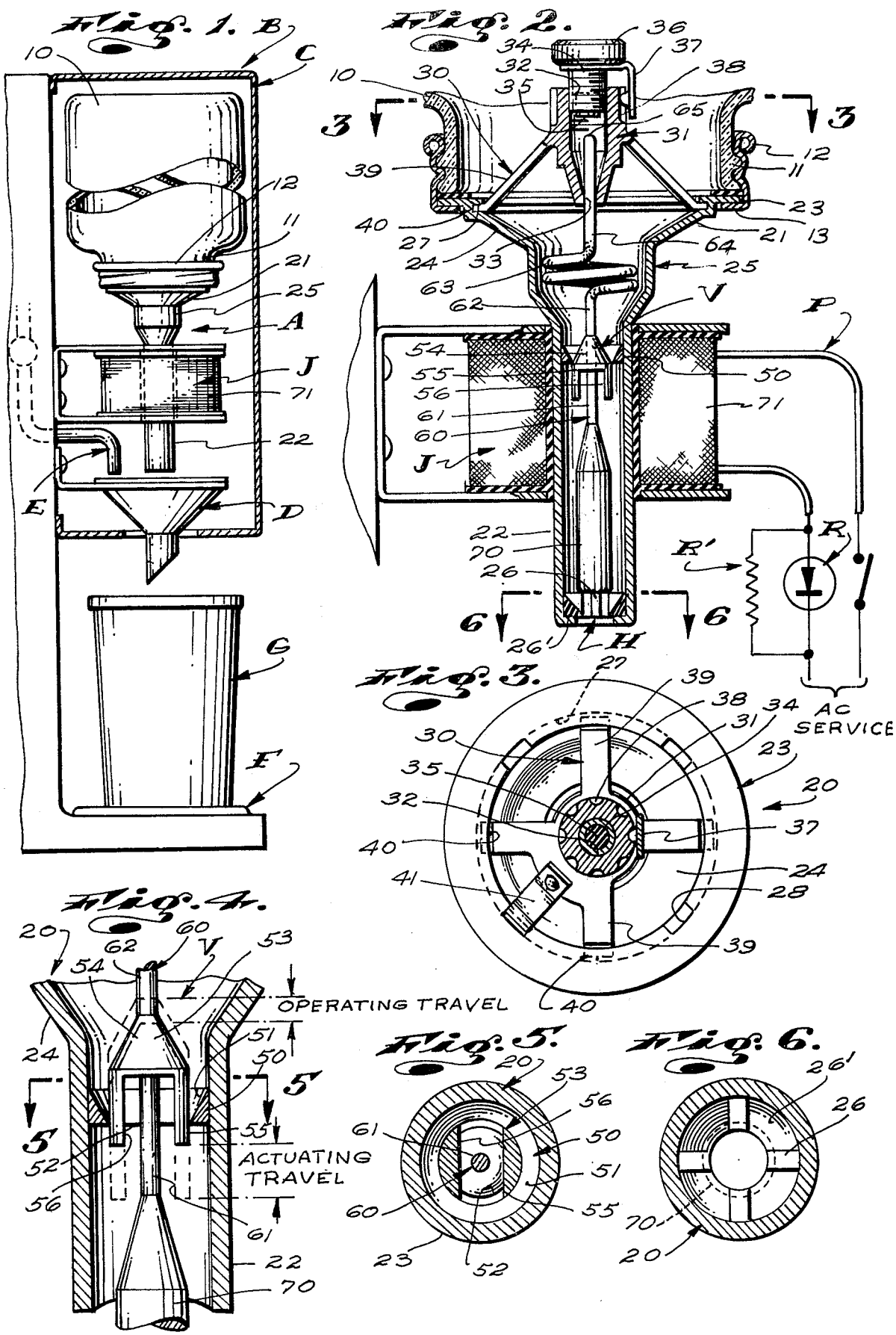

MATERIAL DISPENSER

This invention has to do with an improved material dispensing means and more particularly, is concerned with a means for dispensing predetermined or metered volumes of dry, powdered, granular or particulate materials.

While the means that I provide is suitable for advantageous and effective use in different environments and for handling and/or dispensing many different kinds of materials, I will, for the purpose of this disclosure, describe said means as being a component of and related to a coffee brewing vending machine and will describe and/or refer to the materials handled or dispensed as instant coffee, that is, dehydrated, granular coffee concentrate.

The prior art has provided many different material dispensing means for use in coffee brewing machines to dispense measured volumes of instant coffee. Most of those means have been wanting or found to be inadequate in one or more ways and have met with little or no commercial success. Of those dispensing means provided by the prior art, and which have met with reasonable commercial success, the majority have proved to be less than totally satisfactory for one reason or another.

Having investigated and studied all or the majority of material dispensing means provided by the prior art for use in coffee brewing machines and the like, I have concluded and it is my considered opinion that that dispensing means which is disclosed and claimed in U.S. Pat. No. 3,204,832, issued Sept. 7, 1965, to S. Morgan Barber and entitled "Material Dispensing Apparatus", is the most practical, effective and dependable of such means now in common use; particularly when viewed and considered in light of size, weight, cost of manufacture, service and all other environmental and/or operating parameters and/or factors which exist and which must be accounted for.

The above noted patented dispenser provided by the prior art comprises a material (instant coffee) receiving means defined by the upwardly opening, upper tapered or conical body portion of a funnel-like part in open communication with an inverted, opened, jar of coffee; an elongate discharge passage defined by a depending tubular neck or duct of the funnel like part, a poppet-type valve member normally seated in the lower portion of the conical body, spring means carried by the body above the valve member normally yieldingly urging and holding the valve member down and seated in the body, an elongate ferrous armature fixed to the valve member and depending freely into the passage and a coil about the duct, connected with a switch controlled alternating current power source and operable to cyclically elevate the armature vertically, when energized, thereby elevating the valve member, against the resistance of said spring means, out of its normal seated position and to vibrate the member to permit and to induce instant coffee in the funnel like body portion to flow down, about the valve member, through and thence from the passage or duct.

The above noted spring means comprises a horizontal, resilient, apertured or spider-like diaphragm extending across the upper portion or end of the body, within the coffee therein and is connected with the valve member by a vertical stem. It acts as a reaction means for the armature whereby a desired vibratory or reciprocating action is attained and as vibratory agitator to induce the flow and movement of coffee in and through the structure.

While the above noted dispenser of the prior art operates and functions well, it is nevertheless wanting in some respects. It has been found that in practice, the valve member of the noted structure tends to hammer or pound the granular material moving below it in such a manner that the material is reduced and is caused to stick to the member and to its opposing seating surface in the body. As a result of the above, the structure is subject to becoming plugged up. Also, the noted spring means is such that the valve member and armature are capable of extremely short or limited vertical movement and such that large granules of material which cannot migrate past the valve member will bridge about the member and block the flow of material. There is insufficient movement and/or insufficient violent action afforded by the structure to upset or break down the bridging structures that develop.

Further, the spring means in the noted structure is substantially fixed and the rate of oscillation of the structure afforded by the coil and armature is non-complimentary with the rate of the spring means whereby the spring means serves to dampen or buffer the action of the coil and armature. Still further, the spring means must be biased by the force of the coil thus requiring a strong or high energy coil which draws considerable power and which is subject to generating considerable heat. The heat generated by the coil is often sufficient to result in melting or softening of the instant coffee to an extent that it sticks in and fouls the dispensing structure and requires that dispenser be taken out of service and cleaned at frequent intervals.

Further, the extent to which the valving means opens and therefor the size of granular material that can be passed thereby is controlled by the balance between the forces of the spring means and the coil. The strength and/or force of the spring means is difficult to control and is subject to wide variations as a result of temperature changes and work fatigue. Also, the operational force or strength of the coil is subject to considerable change in response to those drops or changes in voltage which occur in its power supply. As a result of variations or changes in the forces of the spring means and coil, opening of the valving means is not consistant or dependable and adversely affects the accuracy of the dispenser.

Finally, it has been determined that the resilient, horizontal diaphragm-type spring means in the body above the valving means causes bridging and compaction of the instant coffee in the body below the diaphragm which impedes rather than assists inducing the flow of material in and through the construction and more important, causes serious and undesirable particle separation of material above and moving downwardly through the diaphragm. That is, the vibratory action of the diaphragm results in the accelerated downwardly movement of small granules and retards the downward movement of larger granules. The above noted particle separation results in wide variation in the amount of material dispensed. In the case of instant coffee, the first cups of coffee brewed from a supply of instant coffee dispensed are strong and the last cups brewed from that supply are weak.

An object and feature of my invention is to provide an improved material dispensing means of the same general class and type of dispenser referred to above, having novel, improved, valving means which is such that material handled is metered more accurately and which is such that the material is not hammered, pounded or otherwise reduced by the valving means whereby the possibility and/or likelihood of fouling of the dispenser is materially reduced.

Another object and feature of the present invention is to provide a dispenser of the general character referred to above having a free floating valve member and armature assembly, the vertical cyclical travel of which is unimpeded by spring means or the like.

It is an object of my invention to provide a structure of the general character referred to above wherein the free floating valve member and armature assembly is effectively driven by a economical, cool operating coil whereby insufficient heat is generated to soften or melt the instant coffee granules or induce the movement of moisture ladened air into and throughout the instant coffee supply and which would otherwise result in fouling the structure.

An object and feature of my invention is to provide a dispenser of the general character referred to wherein the weight or mass of the free floating valve member and armature is free and operative to move that assembly down in the structure to its normal position where the valving means is closed and a structure wherein the new and novel valving means is such that it is not subject to being held open and prevented from closing by the presence of instant coffee granules in which it operates.

Still another object and feature of the present invention is to provide a dispenser of the character referred to having a vertically adjustable anvil above the valve member and armature assembly to limit vertical upward travel of that assembly and to provide a free floating valve member and armature assembly with integrated, vertically resilient rebound or spring means which absorbs and is biased by the kinetic energy of the assembly when its upward travel is stopped by the anvil and which reacts to drive the assembly downwardly, assisting the mass of the assembly to close the valve means. Said rebound or spring means also serves to agitate and induce the flow of material through the construction.

It is an object and feature of the invention to provide a valve means comprising an orifice ring in a flow passage and an elongate cage-like valve member engaged in and extending through said ring and shiftable therein between open and closed positions.

Yet another object and feature of my invention is to provide a dispenser of the general character referred to having stop means below the valve member to prevent downward displacement of said assembly and normally stopping the valve member in its closed position within the orifice ring.

It is another object and feature of my invention to provide a dispenser of the general character referred to wherein the anvil and/or stop means are such that they absorb forces imparted therein by impacting of the valve member and armature assembly therewith to materially dampen the undesirable generation of sound commonly associated with similar dispensers.

Finally, it is an object and feature of my invention to provide a dispenser of the general character referred to above which includes fewer and easier to make and assemble parts that are included in most prior art dispensers of similar character, whereby the dispenser herein provided is more economical to manufacture, use, service and/or repair.

The foregoing and other objects and features of my invention will be apparent and will be understood from the following detailed description of a typical preferred form and application of my invention, throughout which description reference is made to the accompanying drawings, in which:

FIG. 1 is a view of a portion of a coffee vending machine with portions shown in sections and showing the material dispensing means that I provide related thereto;

FIG. 2 is an enlarged detailed sectional view of the dispensing means of the present invention;

FIG. 3 is a sectional view taken as indicated by line 3—3 on FIG. 2;

FIG. 4 is an enlarged view of a portion of the structure shown in FIG. 2 with parts in another position;

FIG. 5 is a sectional view taken as indicated by line 5—5 on FIG. 4; and

FIG. 6 is a sectional view taken substantially as indicated by line 6—6 on FIG. 2.

Referring to the drawings, the material dispenser A that I provide is shown engaged in a portion of a coffee brewing machine B. The machine B can vary widely in form, design and construction and for the purpose of this disclosure is shown as including a cabinet C in which my dispenser A is suitably supported. The machine next includes an upwardly opening funnel-like mixing unit D below the dispenser A to receive material, such as instant coffee (dehydrated, granular coffee concentrate), dispensed thereby and water supply means E to dispense measured volumes of water into the unit D to mix with the instant coffee. Below the unit D is a shelf or support F to support a cup G or the like and into which the brew mixed in the unit D is free to drain.

In addition to the above, the machine B includes water storage and heating means, valve controlled water metering means (not shown) which are related components of the water supply means E and are suitably arranged in the cabinet C. The machine further includes electro mechanical control means for operatively relating the several means and which is manually controlled to intermittently put or set the machine into operation to dispense a cup of coffee, as desired. Since the details of construction of the overall machine, with its parts and components, can vary widely in practice, without affecting the novelty of the material dispenser that I provide, I will not burden the disclosure with illustration and/or further detailed description of the machine but will limit the following disclosure to the dispenser A alone.

The dispenser A is an elongate vertical assembly including an upper inverted jar 10 with a downwardly opening externally threaded mouth 11. The jar 10 can be and preferably is a standard glass jar or container in which instant coffee is sold and distributed. (The jar can be any suitable form of bin or hopper without departing from the invention).

The dispenser next includes an annular threaded cap-ring 12 engaged with and about the mouth of the jar 10 and which has a radially inwardly projecting annular retaining flange 13. The cap-ring 12 is in the nature of and can be the ring part or element of a standard two-piece Mason jar cap.

The dispenser next includes an elongate material conducting body 20 with an upper collector portion 21 and a lower neck or duct portion 22. The upper collector portion 21 is characterized by a flat radially extending annular flange 23 which is normally engaged between the lower annular rim or edge of the mouth 11 of the jar 10 and the flange 13 of the ring 12; a radially inwardly and downwardly inclined upper funnel portion 24, depending from the flange 23; a straight cylindrical portion 25 depending from the lower end of the portion 24 and a lower radially inwardly and downwardly inclined funnel portion 24' depending or extending downwardly from the portion 25 and joined with the duct portion 22, to communicate therewith.

The duct portion 22 is preferably an elongate straight, vertical tubular part or portion communicating with the lower end of the collector portion 21 to depend therefrom. The lower end of the duct is open and is preferably provided with stop means H which comprises a plurality (4) of radially inwardly projecting, circumferentially spaced stop projections 26. In practice, and as shown in the drawings, the projections 26 of the means H are established of soft shock and/or sound absorbing plastic material such as Nylon and are formed integrally with an annular sleeve-like carrier ring 26' slidably engaged in the duct and retained by a radially inwardly formed lower terminal end portion of the duct.

In addition to the foregoing, the body 20 is provided with a radially inwardly opening annular channel 27 about or adjacent to the flange 23 at the upper end of the collector portion 21 and with a plurality of circumferentially spaced radially inwardly and upwardly opening bayonet-type notches 28 communicating with the channel.

The means A next includes an upper bonnet assembly 30 releasably connected with and projecting upwardly from the upper end of the collector portion 21 of the body 20. The bonnet assembly 30 includes an elongate, cylindrical central hub 31 with a central vertical bore 32; an annular stem bearing or stem receiving guide opening 33 at the lower end of the bore and an elongate cylindrical anvil 34 with a flat downwardly disposed striker surface 35 threadedly engaged in the upper end of the bore and spaced above the opening 33. The anvil 34 projects upwardly from the hub and is provided with a finger engaging head 36 at its upper end. Additionally, the mandrel 34 carries a dimpled indexing spring 37 which depends from the head and yieldingly establishes stopped engagement in radially outwardly opening indexing grooves or detents 38 about the upper exterior portion of the hub.

The bonnet assembly 30 next includes a plurality of circumferentially spaced, radially outwardly and downwardly inclined legs 39 with flat radially outwardly projecting feet 40 at their lower ends. The feet 40 are engageable through the bayonet notches 28 and are shiftable circumferentially into retaining engagement in the channel 27 in the upper end of the body 20.

Finally, the bonnet assembly 30 is provided with a manually engageable, resilient, stop spring 41, which is normally yieldingly engaged in one of the notches 28 to normally releasably retain the assembly in fixed rotative position wherein the feet 40 are out of register with the notches 28 and the assembly 30 is cooperatively coupled with the body 20.

The dispenser A that I provide next includes an annular orifice ring 50 fixed in the upper portion of the passage defined by the duct 22 of the body.

The orifice ring 50 is a part or an element of a valving or material metering means V and is characterized by an annular radially outwardly and upwardly inclined conical surface 51 and an annular lower inner edge 52.

In practice, the orifice ring can be formed integrally in or with the duct if desired, or if circumstances require.

The material metering or valving means next includes an elongate vertical cage-like valving member 53 with radially inwardly and upwardly convergent conical upper end portion 54 and a straight cylindrical lower portion 55 with radially outwardly and downwardly opening material conducting openings or notches 56. The lower portion 55 is substantially equal in diametric extent with the diameter of the edge 52 of the orifice 50 (allowing for free sliding movement therebetween). The valve member 53 is normally arranged centrally in the duct with the upper edge or end of its lower portion 55 at or slightly above the lower inner edge 52 of the orifice ring 50, to effectively close the orifice. The member 53 is shiftable vertically in the duct and relative to the orifice ring to an upper open position where the upper portions of the notches 56 in the lower portion 55 occur above the edge 52 and communicate with the interior of the orifice ring and with the duct above said ring. The lower end portion of the lower portion 55 remains engaged through the ring 50 when the member 53 is in its up or open position.

The valve member 53 is carried by an elongate central stem unit 60 which has a lower portion 61 depending from the valve member to engage an armature 70 of an electric drive means J, which will hereafter be described. The stem next has an elongate upper portion 62. The portion 62 has an axially yieldingly, helical, central spring portion 63 formed integrally therein and which normally occurs freely within the cylindrical portion 25 of the receiver portion of the body 20 for free vertical shifting therein. Finally, the portion 62 has a straight upper portion 64 which projects upwardly through the guide opening 33 at the lower end of the hub and which terminates at at an upper striker end 65, within the bore 32 in the hub 31, in normal predetermined spaced relationship below the striker surface 35 of the anvil 34 carried by the hub. The upper striker end of the stem is adapted to strike and stop against the surface 35 of the anvil when the valve member 53 is shifted vertically to present or position desired portions of the notches 56 of the valve member 53 in material conducting communication with the interior of the duct above the edge 52 of the orifice ring 50.

In the preferred carrying out of the invention, and as shown in the drawings, the lower end of the anvil 34 is provided with a sound deadening body, cushion or plug, also at 35, of Nylon or the like, and which defines the surface 35 or downwardly disposed surface against which the end 65 of the stem strikes.

The drive means J includes an elongate cylindrical ferrous metal armature 70 having a substantially flat lower end normally stopped and supported by the stop means H at the lower end of the duct and an upwardly and radially inwardly convergent material deflecting upper end joined with the lower end of the lower portion 61 of the stem 60. The armature 70 is substantially smaller in diameter than the passage in the duct; is arranged centrally therein and cooperates therewith to define a material conducting annulus in and through that portion of the duct in which the armature occurs.

The means J next includes an annular coil 71 freely engaged about the exterior of the duct and the field of which extends through the duct and the armature within the duct. The means J next includes a power supply P for the coil which power supply is under control of a suitable switch means S. The power supplied for the coil can, for example, be standard 60 cycle power service.

In practice, if desired, and as shown in FIG. 2 of the drawings, a half-wave rectifier R can be engaged in the power supply P, in series with the coil 71 whereby the coil is, in effect, intermittently energized by pulsating direct current. The power supply is further provided with a resistor R' arranged in parallel with the rectifier and is such that when the rectified power to the coil is off and the field of the coil is collapsing, a small amount of alternating current continues to flow through the coil and the component of the power induces a reverse EMF in the coil to supplement and/or control the reverse EMF generated by the collapsing field of the coil. With this rectifier and resistor arrangement and by varying or changing the value of the resistor R', the reverse or back EMF of the coil can be varied, modified or adjusted so as to modify or adjust the downward action or movement of the inner armature, stem and valve member assembly to suit the needs and/or requirements for the effective dispensing of different powdered or granular materials. With this circuit, the inner assembly is driven downwardly by the coil, with a desired predetermined force, not simply by a reverse EMF which would be generated by the collapsing field of the coil, if only the rectifier R was included in the power supply. Accordingly, the provision of the resistor R' in parallel with the rectifier R in the power supply P for the coil 71 establishes a greatly improved, adjustable circuit which is distinct from and should not be confused with a power supply for a similar coil which includes a rectifier but not a resistor in parallel therewith.

The coil is arranged or positioned vertically or axially, relative to the duct and the armature so that when the rectified power is off, the armature drops or is moved downwardly by the reverse EMF generated by the collapsing field and supplemented by the corresponding unrectified wave portion of the alternating current passing through the resistor R' to the above noted, normal, stopped position against the means H in the bottom of the duct. Accordingly, when the coil is energized by rectified power and the small amount of unrectified power, the armature is elevated and driven, with maximum force, vertically in the duct to a position where the valve member is in a fully open position and the upper end of the stem strikes and is stopped by the anvil 34. Thereafter, the armature is driven downwardly by a predetermined, desired, lesser, electro motor force generated by the collapsing field and the small amount of unrectified power passing through the resistance.

In the preferred carrying out of the invention, the coil is mounted in fixed position in the machine cabinet and the duct 22 of the body is slidably engaged in and through the coil whereby the body 20 and all the parts of the structure within and carried by the body can be disengaged from within the coil and removed from the machine for the purpose of clearing or servicing the structure, refilling the jar 10 and the like. The weight of the jar, its contents and the body 20 with its directly related means and structure, is sufficient to maintain the duct portion engaged on the coil when the structure is in use.

The coiled spring portion 63 of the stem serves as a shaker and agitator means within the receiver portion 21 of the body 20 and effectively induces the substantially uniform and free flow of material from the jar 10, downwardly through the receiver portion 21, into the duct, into the orifice ring about the valve member and thence inwardly and downwardly through the notches in the valve member, when the structure is operated or driven.

Vertical movement of the valve member and of the armature assures free and desired movement of material downwardly through and from the open lower end of the duct, when the structure is operated.

In operation, the armature and valve member are cyclically elevated and lowered by the electromotive force of the coil. Upon each upwardly driven movement of the armature and valve member, the stem strikes the anvil and the kinetic energy of the upwardly moving mass results in biasing the spring 63 of the stem. Upon de-energizing of the coil with the principal rectified power, and as the field of the coil collapses, the biased spring drives the valve member and armature downwardly toward their normal position. In practice, the valve member does not reach its normal closed position and the armature does not reach its normal stopped position before the coil is again energized with rectified power to drive the valve member and armature upwardly and the stem 60 into striking, stopped engagement with the anvil. As a result, during the dispensing operation, the valve member is shifted vertically upwardly and downwardly throughout a limited upper portion of its total vertical travel, throughout which limited travel, portions of the notches 56 occur above the orifice ring and the valve member remains open.

With the structure here provided, by changing the vertical positioning of the striking surface 35 of the anvil 34, the maximum vertical travel of the valve member and the extent to which the valve member opens can be effectively and accurately adjusted and varied. By such adjustment of the valve means, metering of the flow of material through the construction can be easily and accurately varied and adjusted, as desired.

It is to be particularly noted that in operation, the inside valve and armature assembly is driven upwardly by the coil by the rectified power so that the stem strikes the anvil 34 and so that the said inside assembly is free to be instantly driven back or downwardly by the biased spring means in the stem. The rate of the spring means is no less than the cyclical rate of the coil and is preferably slightly greater than the cyclical rate of the coil. As a result, the spring or spring means herein provided does not materially dampen, buffer and/or slow the vertical driving force afforded by the coil; allows for full or complete upward travel of the inside assembly and, supplemented with the forces of the coil generated by the alternating current passed by the resistor R', effectively drives the inside assembly downwardly with that substantial positive, rebounding force stored and delivered by the spring.

With the structure that I provide, it will be apparent that the inside assembly does not simply vibrate at a high speed. Rather, there is imparted into that assembly definite reciprocal movement of substantial magnitude which is capable of physically moving the material to an extent required to assure the movement, flow or transportation of the material in and through the structure and which will prevent possible undesirable bridging of the material in the structure and other adverse effects which might result from insufficient movement or agitation of the material.

It will be further noted that with the valve means that I provide, the material flowing through the valve member (when said means is in open position) is not pounded or hammered by the valve member in such a manner as to reduce the material to any appreciable extent and is not acted upon by the valve member to cause the material to stick or become bonded to the valve member and/or orifice ring in a manner which might foul and plug the structure.

It is to be particularly noted that the coil is only required to move or elevate the valve member and armature assembly; it does not have to bias any spring means or the like. Accordingly, a low energy coil, drawing a small amount of current, is used to drive the structure and a small amount of heat is generated by the construction when in operation. The amount of heat generated in operation of the present invention is insufficient to melt the product and is insufficient to cause or result in the creation of adverse effects by a combination of heat and moisture.

Having described only typical forms and applications of my invention, I do not wish to be limited to the specific details herein set forth, but wish to reserve to myself any modifications and/or variations which may appear to those skilled in the art and which fall within the scope of the following claims.

Having described my invention, I claim:

1. A material dispenser comprising a material receiver, an elongate vertical material conducting duct communicating with and depending from the receiver and having a lower open discharge end, a vertically opening orifice smaller in diameter than the duct and positioned in the duct above the lower end thereof, an elongate valving member normally engaged in the orifice in a normal closed position and shiftable vertically relative thereto to an open actuated position, an elongate vertically armature in the duct below the orifice and valve member and freely shiftable vertically in the duct from a lower normal position to an upper actuated position therein, means drivingly connecting the armature and the valve member, an annular coil about the duct and positioned so its field intersects the upper portion of and extends above the armature when said armature in its normal position is drivingly elevated in the duct and the valve member is moved from its normal to its actuated position when the coil is energized, a power supply with on and off switch means connected with and selectively operable to cyclically energize the coil, an elongate vertical stem with an upwardly disposed striker end projecting upwardly from the valve member, an anvil normally spaced above the stem and engaged by the striker end of the stem when the armature, valve member and stem are drivingly elevated by the coil, said stem having axially compressible spring means biased by the kinetic energy of the mass of the structure elevated by the coil when it is stopped by the anvil and which yieldingly urges the valve member and armature downwardly toward their normal positions between cyclical energization of the coil.

2. The material dispenser set forth in claim 1 wherein the valve member is an elongate vertical member extending through the orifice and has elongate vertically extending radially outwardly and downwardly opening material conducting notches in its lower portion normally occurring below the orifice and shiftable to extend through the orifice and communicate with the duct above the orifice when the valve member is elevated to an actuated position.

3. The material dispenser set forth in claim 1 which includes a stem guide spaced below the anvil and through the upper portion of the stem is slidably engaged.

4. The material dispenser set forth in claim 1 in which said spring means comprises an axially extending helically wound portion in the stem between the striker end thereof and the valve member and positioned in the receiver to agitate material in the receiver as it shifts vertically with the stem.

5. The material dispenser set forth in claim 1 which further includes stop means in the duct below and normally engaging and supporting the armature.

6. The material dispenser set forth in claim 1 wherein the valve member is an elongate vertical member extending through the orifice and has elongate vertically extending radially outwardly and downwardly opening material conducting notches in its lower portion normally occurring below the orifice and shifted to extend through the orifice and communicate with the duct above the orifice when the valve member is elevated to an actuated position, and a stem guide spaced below the anvil and through which the upper portion of the stem is slidably engaged.

7. The material dispenser set forth in claim 1 wherein the valve member is an elongate vertical member extending through the orifice and has elongate vertically extending radially outwardly and downwardly opening material conducting notches in its lower portion normally occurring below the orifice and shiftable to extend through the orifice and communicate with the duct above the orifice when the valve member is elevated to an actuated position, and said spring means comprises an axially extending helically wound portion in the stem between the striker end thereof and the valve member and positioned in the receiver to agitate material in the receiver as it shifts vertically with the stem.

8. The material dispenser set forth in claim 1 wherein the valve member is an elongate vertical member extending through the orifice and has elongate vertically extending radially outwardly and downwardly opening material conducting notches in its lower portion normally occurring below the orifice and shiftable to extend through the orifice and communicate with the duct above the orifice when the valve member is elevated to an actuated position, stop means in the duct below and normally engaging and supporting the armature.

9. The material dispenser set forth in claim 1 which includes a stem guide spaced below the anvil and through which the upper portion of the stem is slidably engaged, and said spring means comprises an axially extending helically wound portion in the stem between the striker end thereof and the valve member and occurring in the receiver to agitate material in the receiver as it is shifted vertically with the stem.

10. The material dispenser set forth in claim 1 which includes a stem guide spaced below the anvil and through which the upper portion of the stem is slidably engaged, and stop means in the duct below and normally engaging and supporting the armature.

11. The material dispenser set forth in claim 1 in which said spring means comprises an axially extending helically wound portion in the stem between the striker end thereof and the valve member occurring in the receiver to agitate material in the receiver as it is shifted vertically with the stem, and stop means in the duct below and normally engaging and supporting the armature.

12. A material dispenser comprising a material receiver, an elongate vertical material conducting duct communicating with and depending from the receiver and having a lower open discharge end, a vertically opening metering orifice in the duct, a valving member normally engaged in the orifice in a normal closed position and shiftable vertically to an open position, an armature freely engaged in the duct and shiftable upwardly therein from a lower normal position, means drivingly connecting the armature and the valve member, an annular coil about the duct and positioned so its field normally intersects the armature whereby the armature is drivingly elevated and the valve member is moved to its open position when the coil is energized, a power supply connected with and operable to cyclically energize the coil and including a half-wave rectifier in series with the coil and a resistor in parallel with the rectifier, whereby the coil is energized by pulsating direct current and supplemental alternating current.

13. The structure set forth in claim 12 and including an elongate vertical stem projecting upwardly from the valve member with an upwardly disposed striker end, an anvil normally spaced above the stem and engaged by said striker end when the armature, valve member and stem are elevated by the coil and axially compressible spring means in the stem and biased by the kinetic energy of the mass of the structure elevated when said end engages the anvil and operable to yieldingly urge the valve member and armature downwardly in the duct.

14. The material dispenser set forth in claim 12 wherein the valve member has elongate vertically extending radially outwardly and downwardly opening material conducting notches normally occurring below the orifice and shiftable to extend through the orifice and communicate with the duct above the orifice when the valve member is elevated.

15. The material dispenser set forth in claim 12 which further includes stop means in the duct below and normally engaging the armature.

16. The material dispenser set forth in claim 12 wherein the valve member has radially outwardly and downwardly opening material conducting notches normally occurring below the orifice and shiftable to extend through the orifice and communicate with the duct above the orifice when the valve member is elevated, a stem with an upper striker end projecting up from the valve member and an anvil normally spaced above the stem, axially compressible spring means comprising an axially extending helically wound portion in the stem between the striker end thereof and the valve member to agitate material about the stem and above the valve member as it is shifted vertically with the stem and biased when said end engages the anvil and operable to yieldingly drive the valve member and armature downwardly, and stop means in the duct below and normally engaging the armature.

* * * * *